(12) United States Patent
Seto et al.

(10) Patent No.: US 9,573,580 B2
(45) Date of Patent: Feb. 21, 2017

(54) CHARGE CONTROL DEVICE FOR HYBRID VEHICLE

(71) Applicant: Mitsubishi Jidosha Kogyo Kabushiki Kaisha, Tokyo (JP)

(72) Inventors: Hiroki Seto, Nukata-gun (JP); Shinsaku Tomita, Owariasahi (JP); Hiroyuki Suzuki, Okazaki (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 66 days.

(21) Appl. No.: 14/108,855

(22) Filed: Dec. 17, 2013

(65) Prior Publication Data

US 2014/0172216 A1 Jun. 19, 2014

(30) Foreign Application Priority Data

Dec. 18, 2012 (JP) ................. 2012-276020

(51) Int. Cl.
*B60W 20/00* (2016.01)
*B60L 11/18* (2006.01)
(Continued)

(52) U.S. Cl.
CPC ............... *B60W 10/06* (2013.01); *B60K 6/52* (2013.01); *B60L 11/126* (2013.01); *B60L 11/14* (2013.01); *B60L 11/1861* (2013.01); *B60W 20/13* (2016.01); *B60L 2240/445* (2013.01); *B60L 2240/545* (2013.01); *B60L 2240/80* (2013.01); *B60L 2250/16* (2013.01);
(Continued)

(58) Field of Classification Search
USPC .......................................... 701/22
See application file for complete search history.

(56) References Cited

U.S. PATENT DOCUMENTS 4,875,446 A * 10/1989 Nemoto ............... F02D 31/005
                                                        123/339.22
5,806,486 A *  9/1998 Gee ..................... F02D 41/08
                                                        123/339.22
(Continued)

FOREIGN PATENT DOCUMENTS

JP       8-168103 A    6/1996
JP    2001-182580 A    7/2001
(Continued)

*Primary Examiner* — Jean-Paul Cass
(74) *Attorney, Agent, or Firm* — Birch, Stewart, Kolasch & Birch, LLP

(57) ABSTRACT

A charge control device for a hybrid vehicle includes a driving battery supplying electric power to front and rear motors. It can switch between a normal power generation mode in which an engine is driven at a first rotational speed higher than an idling speed to generate electric power and charge the driving battery to a predetermined amount of charge, and a forced power generation mode in which the engine is forcedly driven at the first rotational speed or higher to generate electric power and charge the battery so as to maintain a higher amount of charge of the driving battery than a predetermined amount of charge, and drives the engine at an idling speed or lower to reduce an amount of electric power generation if the cooling water of the engine is a first predetermined temperature or higher when the forced power generation mode is performed.

12 Claims, 3 Drawing Sheets

(51) Int. Cl.
  B60W 10/06 (2006.01)
  B60L 11/12 (2006.01)
  B60L 11/14 (2006.01)
  B60K 6/52 (2007.10)

(52) U.S. Cl.
  CPC ....... *B60L 2260/22* (2013.01); *B60L 2260/26* (2013.01); *B60L 2260/28* (2013.01); *B60W 2510/0676* (2013.01); *B60W 2710/244* (2013.01); *Y02T 10/6217* (2013.01); *Y02T 10/6265* (2013.01); *Y02T 10/648* (2013.01); *Y02T 10/7005* (2013.01); *Y02T 10/705* (2013.01); *Y02T 10/7044* (2013.01); *Y02T 10/7077* (2013.01)

(56) References Cited

U.S. PATENT DOCUMENTS

| | | | | |
|---|---|---|---|---|
| 6,294,843 B1* | 9/2001 | Kato | .................. | B60K 6/485 180/65.26 |
| 6,612,386 B2* | 9/2003 | Tamai | .................. | B60K 6/48 180/65.25 |
| 7,200,476 B2* | 4/2007 | Cawthorne | ........... | B60K 6/445 180/65.265 |
| 7,305,873 B2* | 12/2007 | Hubbard | ............. | B60K 6/445 180/65.8 |
| 7,594,491 B2* | 9/2009 | Yanagida | ............. | F02N 11/04 123/179.28 |
| 7,653,478 B2* | 1/2010 | Park | ............. | B60K 6/48 123/179.4 |
| 7,908,064 B2* | 3/2011 | Cawthorne | ........... | B60K 6/445 180/65.24 |
| 8,030,863 B2* | 10/2011 | Yoshida | ............. | B60K 1/00 318/400.01 |
| 8,307,927 B2* | 11/2012 | Taguchi | ............. | H02P 29/0088 180/65.285 |
| 8,342,142 B2* | 1/2013 | Shintani | ............. | F01P 7/164 123/41.12 |
| 8,349,509 B2* | 1/2013 | Yoshida | ............. | H01M 8/04089 429/428 |
| 8,731,762 B1* | 5/2014 | Wang | ............. | B60L 15/2045 701/22 |
| 2002/0057074 A1* | 5/2002 | Aoyama | ............. | H02J 7/1438 322/36 |
| 2004/0148071 A1* | 7/2004 | Itoh | ............. | B60K 6/48 701/22 |
| 2004/0178756 A1* | 9/2004 | Zhenxing | ............. | B60K 6/48 318/432 |
| 2005/0080537 A1* | 4/2005 | Cawthorne | ........... | B60K 6/445 701/51 |
| 2005/0182526 A1* | 8/2005 | Hubbard | ............. | B60K 6/445 701/1 |
| 2005/0252305 A1* | 11/2005 | Hubbard | ............. | B60K 6/445 73/860 |
| 2005/0256623 A1* | 11/2005 | Hubbard | ............. | B60L 11/123 701/54 |
| 2007/0078580 A1* | 4/2007 | Cawthorne | ........... | B60K 6/445 701/51 |
| 2007/0175429 A1* | 8/2007 | Yanagida | ............. | F02N 11/04 123/179.14 |
| 2007/0202367 A1* | 8/2007 | Yoshida | ............. | H01M 8/04089 429/434 |
| 2008/0059035 A1* | 3/2008 | Siddiqui | ............. | B60K 6/445 701/93 |
| 2009/0066283 A1* | 3/2009 | Son | ............. | H02P 29/0055 318/473 |
| 2009/0120701 A1* | 5/2009 | Taguchi | ............. | H02P 29/0088 180/65.285 |
| 2009/0289583 A1* | 11/2009 | Yoshida | ............. | B60K 1/00 318/400.01 |
| 2010/0083916 A1* | 4/2010 | Shintani | ............. | F01P 7/164 123/41.1 |
| 2010/0131138 A1* | 5/2010 | Song | ............. | B60L 11/1887 701/22 |
| 2011/0014534 A1* | 1/2011 | Sung | ............. | H01M 8/04037 429/429 |
| 2011/0127958 A1* | 6/2011 | Ishishita | ............. | B60L 11/1862 320/109 |
| 2012/0235640 A1* | 9/2012 | Bridges | ............. | B60L 8/003 320/109 |
| 2012/0323427 A1* | 12/2012 | Endo | ............. | B60K 6/445 701/22 |
| 2013/0074525 A1* | 3/2013 | Johnston | ............. | B60H 1/00278 62/56 |
| 2013/0298583 A1* | 11/2013 | O'Donnell | ........ | H01M 6/5038 62/115 |
| 2014/0158340 A1* | 6/2014 | Dixler | ............. | F28F 27/00 165/287 |

FOREIGN PATENT DOCUMENTS

| | | |
|---|---|---|
| JP | 2004-147460 A | 5/2004 |
| JP | 2012-171557 A | 9/2012 |

\* cited by examiner

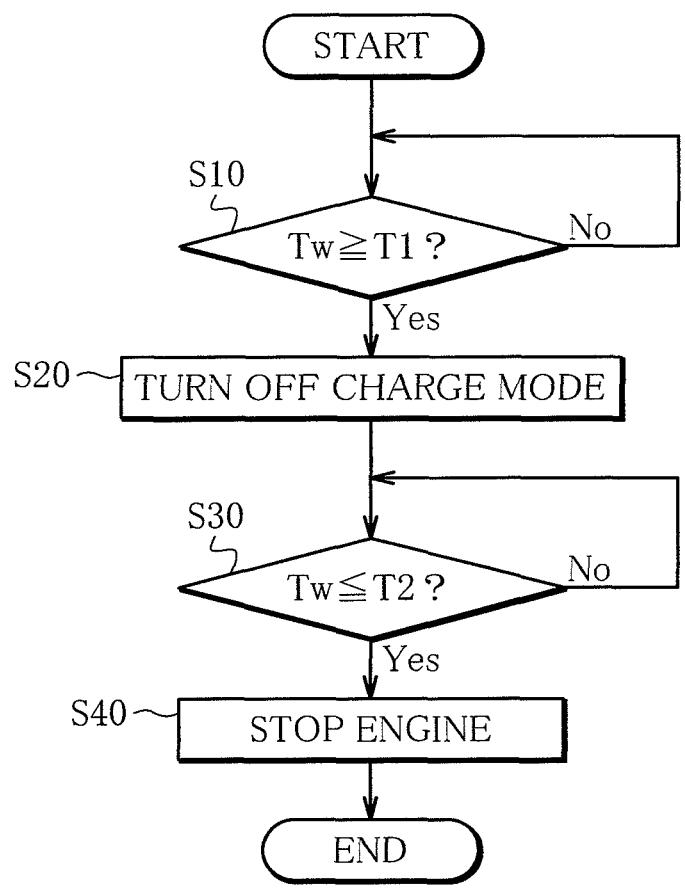

CHARGE CONTROL DEVICE FOR HYBRID VEHICLE

BACKGROUND OF THE INVENTION

Field of the Invention

The present invention relates to a charge control technique for a battery of a hybrid vehicle.

Description of the Related Art

A vehicle such as a hybrid vehicle including an engine, a travel driving motor, and a driving battery can use a power generator driven by the engine to charge the driving battery. Such a hybrid vehicle allows a normal power generation mode in which, for example, when a state of charge of the driving battery decreases, the engine is automatically actuated to charge the driving battery.

Further, a vehicle has been also developed that allows a forced power generation mode in which an engine is forcedly actuated by an occupant operating a switch or the like to generate electric power until a driving battery is almost fully charged.

Also, many hybrid vehicles include a cooling system that cools electric instruments such as a power generator, a travel driving motor, and an inverter that controls supply of electric power to the travel driving motor. For example, Japanese Patent Laid-Open No. 2012-171557 discloses a hybrid vehicle having a configuration in which engine cooling water is circulated to cool an electric instrument such as an inverter.

However, if the hybrid vehicle including the cooling system for the electric instrument as described above further allows a forced power generation mode, performing the forced power generation mode increases a load on the engine to increase a temperature of the cooling water, which may make it difficult to cool the engine itself, and further cool the electric instrument such as an inverter using the cooling system.

SUMMARY OF THE INVENTION

The present invention is achieved to solve the above described problem, and has an object to provide a charge control device for a battery that can limit a temperature increase of engine cooling water to ensure cooling performance in a hybrid vehicle that allows a forced power generation mode.

To achieve the object, the present invention provides a charge control device for a hybrid vehicle, including: an engine that drives a power generator included in the vehicle; a driving motor that causes the vehicle to travel using electric power supplied from a driving battery; a temperature detection unit for detecting a temperature of cooling water of the engine; and a power generation control unit for controlling switching between a normal power generation mode in which the engine driven at a first rotational speed higher than an idling speed is driven to drive the power generator to generate electric power and charge the driving battery to a predetermined amount of charge, and a forced power generation mode in which the engine driven at the first rotational speed or higher is driven to drive the power generator to generate electric power and charge the driving battery so as to maintain a higher amount of charge of the driving battery than the predetermined amount of charge, wherein the power generation control unit drives the engine at the idling speed or lower to reduce an amount of electric power generation by the power generator if the temperature of the cooling water of the engine is a first predetermined temperature or higher while the forced power generation mode is performed.

Thus, if the temperature of the cooling water of the engine is the first predetermined temperature or higher while the forced power generation mode is performed, the engine is driven at the idling speed or lower to reduce the amount of electric power generation by the power generator, thereby limiting a load on the engine that drives the power generator. This can limit a temperature increase of the engine cooling water to ensure cooling performance of the engine. Also, when a cooling system is provided that uses the engine cooling water to cool an instrument other than the engine, cooling performance of the instrument that is cooled by the cooling system can be ensured.

Also, idling of the engine can maintain circulation of the engine cooling water, limit a partial temperature increase of the engine cooling water in an engine cooling water channel to protect the engine cooling water channel, and allows accurate detection of the temperature of the engine cooling water, thereby increasing reliability of an alarm or the like issued based on the temperature of the engine cooling water.

BRIEF DESCRIPTION OF THE DRAWINGS

The present invention will become more fully understood from the detailed description given hereinafter and the accompanying drawings which are given by way of illustration only, and thus, are not limitative of the present invention, and wherein:

FIG. 3 is a flowchart showing a manner of restriction control in a battery charge mode of a hybrid control unit of this embodiment.

DETAILED DESCRIPTION OF THE INVENTION

Now, an embodiment of the present invention will be described with reference to the drawings.

Figure 1:
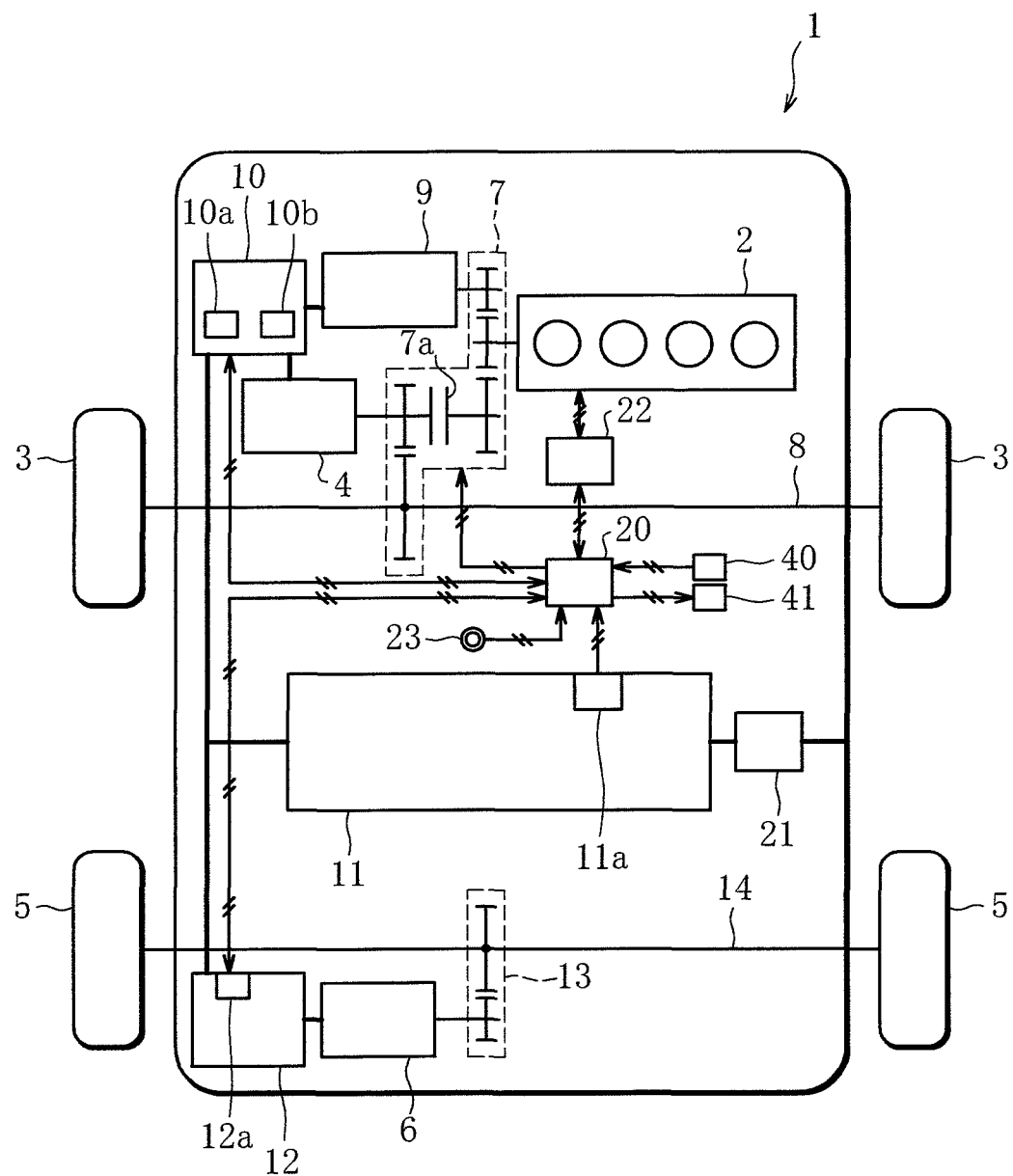
FIG. 1 is a schematic diagram of a plug-in hybrid vehicle according to an embodiment of the present invention.

FIG. 1 is a schematic diagram of a plug-in hybrid vehicle (hereinafter referred to as vehicle 1) according to an embodiment of the present invention.

As shown in FIG. 1, the vehicle 1 of this embodiment is a four-wheel-drive vehicle that can travel by driving front wheels 3 using an output of an engine 2, and includes an electric front motor 4 (driving motor) that drives the front wheels 3, and an electric rear motor 6 (driving motor) that drives rear wheels 5.

The engine 2 can drive a drive axle 8 of the front wheels 3 via a reducer 7, and drive a power generator 9 via the reducer 7 to generate electric power.

The front motor 4 is driven by electric power of a high voltage supplied from a driving battery 11 and the power generator 9 included in the vehicle 1 via a front inverter 10, to drive the drive axle 8 of the front wheels 3 via the reducer 7. The reducer 7 includes a clutch 7a that can connect/disconnect transmission of power between an output shaft of the engine 2 and the drive axle 8 of the front wheels 3.

The rear motor 6 is driven by electric power of a high voltage supplied from the driving battery 11 and the power generator 9 via a rear inverter 12 to drive a drive axle 14 of the rear wheels 5 via a reducer 13.

The electric power generated by the power generator 9 can charge the driving battery 11 via the front inverter 10, and can be supplied to the front motor 4 and the rear motor 6.

The driving battery 11 includes a secondary battery such as a lithium-ion battery, has a battery module (not shown) including a plurality of battery cells together, and further includes a battery monitoring unit 11a that monitors a temperature, a state of charge (SOC) and the like of the battery module.

The front inverter 10 includes a front motor control unit 10a and a generator control unit 10b. The front motor control unit 10a controls an output of the front motor 4 based on a control signal from a hybrid control unit 20 (power generation control unit). The generator control unit 10b has a function of controlling an amount of electric power generation of the power generator 9 based on a control signal from the hybrid control unit 20.

The rear inverter 12 includes a rear motor control unit 12a. The rear motor control unit 12a has a function of controlling an output of the rear motor 6 based on a control signal from the hybrid control unit 20.

Also, the vehicle 1 includes a charger 21 that charges the driving battery 11 using an external power supply.

The hybrid control unit 20 is a control device for generally controlling the vehicle 1, and includes an input/output device, a storage device (ROM, RAM, nonvolatile RAM, or the like), a central processing unit (CPU), a timer, or the like.

To an input side of the hybrid control unit 20, the battery monitoring unit 11a of the driving battery 11, the front motor control unit 10a and the generator control unit 10b of the front inverter 10, the rear motor control unit 12a of the rear inverter 12, and an engine control unit 22 that controls driving of the engine 2 are connected, detection and actuation information from these instruments are input, and operation information by a driver such as an amount of accelerator operation or the like is also input.

On the other hand, to an output side of the hybrid control unit 20, the front motor control unit 10a and the generator control unit 10b of the front inverter 10, the rear motor control unit 12a of the rear inverter 12, the reducer 7 (clutch 7a), and the engine control unit 22 are connected.

The hybrid control unit 20 sends a control signal to the engine control unit 22, the front motor control unit 10a, the generator control unit 10b, the rear motor control unit 12a, and the reducer 7 (clutch 7a) based on the various kinds of detection and actuation information and the operation information such as the amount of accelerator operation as described above, to control switching among hybrid control modes (for example, an electric vehicle mode, a series mode, and a parallel mode), outputs from the engine 2, the front motor 4, and the rear motor 6, and the amount of electric power generation of the power generator 9.

The generation control unit included in the hybrid control unit 20 controls driving of the power generator 9 to increase electric power to be generated, and performs a normal power generation mode in which charging electric power is supplied to the driving battery 11 when a state of charge of the driving battery 11 is lower than a predetermined amount of charge (for example, 30%), so as to maintain the state of charge of the driving battery 11 at the predetermined amount of charge. At this time, the hybrid control unit 20 causes the engine control unit 22 to set a rotational speed of the engine 2 to a rotational speed (first rotational speed) higher than an idling speed as required to increase the output.

Further, the vehicle 1 of this embodiment can switch to a forced power generation mode (battery charge mode) in which the driving battery 11 is charged so that the state of charge of the driving battery 11 is an amount of charge higher than the predetermined amount of charge (for example, a state of charge of 100%).

The battery charge mode is performed by the driver or the like operating a battery charge mode switch 23 (switch) provided on a driver's seat in the vehicle 1. When the battery charge mode is performed, electric power is generated by the power generator at the same engine rotational speed as in the normal power generation mode, or at an engine rotational speed higher than the first rotational speed, and the power generation is continued until the state of charge of the driving battery 11 is almost full.

Figure 2:
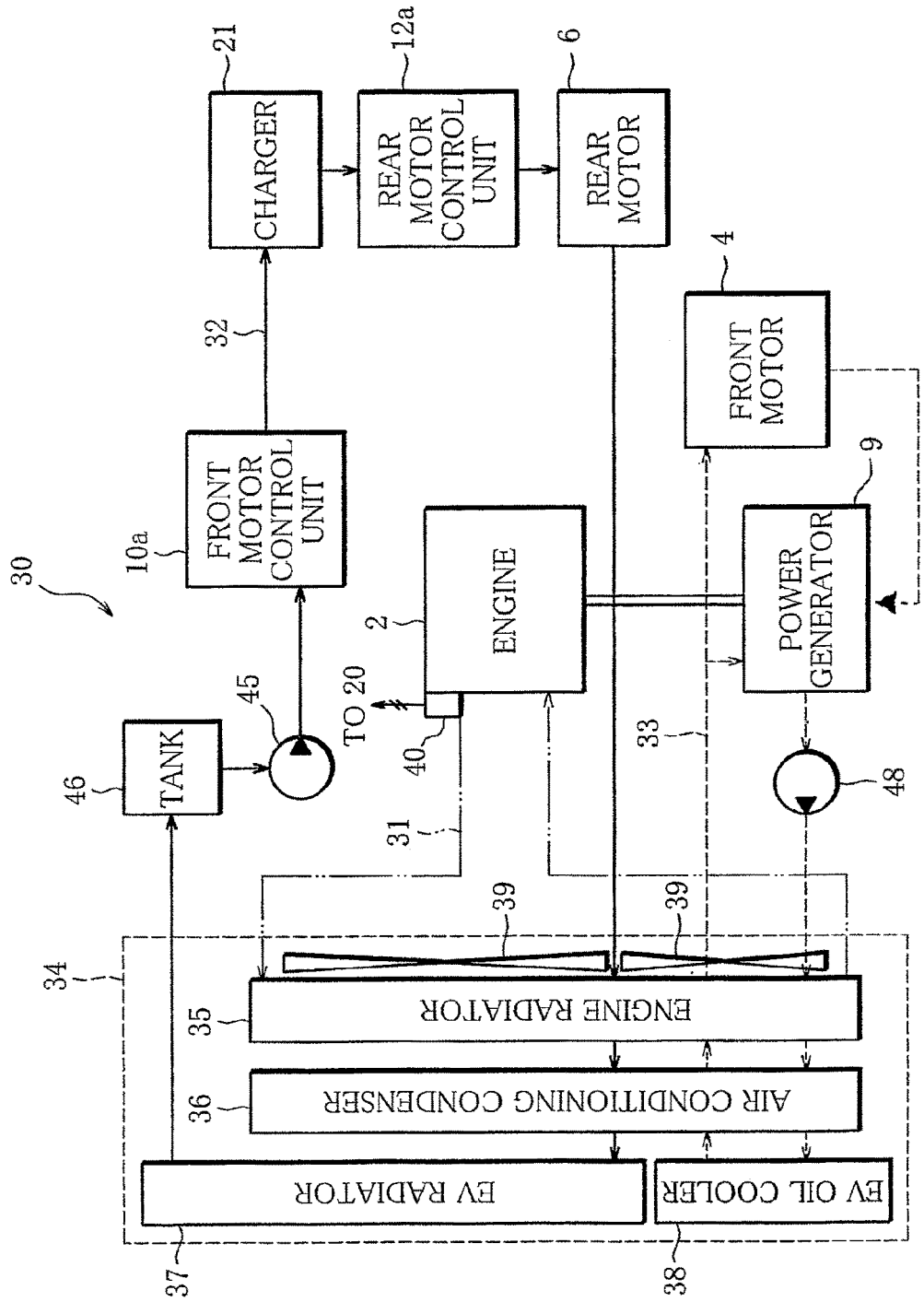
FIG. 2 is a diagram of a cooling system in the plug-in hybrid vehicle of this embodiment.

FIG. 2 is a diagram of a cooling system 30 in the vehicle 1 of this embodiment.

As shown in FIG. 2, the cooling system 30 of the vehicle 1 includes three independent cooling circuits in which a heat medium is circulated: an engine cooling water channel 31, a cooling water channel (EV cooling water channel 32) and an oil channel (EV cooling oil channel 33) for cooling various electric instruments in the vehicle 1.

A heat exchanger 34 provided in the cooling system 30 includes an engine radiator 35 combined with an air conditioning condenser 36 for cooling a coolant in a vehicle air conditioning device, an electric instrument cooling radiator (EV radiator 37), and an electric instrument cooling oil cooler (EV oil cooler 38), and has a function of performing heat exchange between outside air supplied by actuating an electric fan 39 and each heat medium.

The engine cooling water channel 31 is a circulation path in which cooling water (engine cooling water) is circulated between the engine radiator 35 and the engine 2, and has a function of cooling the engine 2 using the engine cooling water circulated by a cooling water pump (not shown) included in the engine 2. The engine cooling water channel 31 includes a cooling water temperature sensor 40 (temperature detection unit) that detects a temperature (engine cooling water temperature Tw) of the engine cooling water discharged from the engine 2. The engine cooling water temperature Tw detected by the cooling water temperature sensor 40 is input to the hybrid control unit 20, and a cooling water temperature indicator 41 provided on a driver's seat panel in the vehicle 1 is configured to light up when the temperature is a predetermined temperature higher than 100° C. (abnormal temperature).

The EV cooling water channel 32 is a cooling water circulation path in which an electric water pump 45, the front motor control unit 10a, the charger 21, the rear motor control unit 12a, the rear motor 6, the EV radiator 37, and a tank 46 are mounted in this order.

Cooling water is stored in the tank 46, and the electric water pump 45 is driven to circulate the cooling water in the tank 46 in the EV cooling water channel 32. Thus, cooling water at a low temperature cooled by the EV radiator 37 can cool the front motor control unit 10a, the charger 21, the rear motor control unit 12a, and the rear motor 6.

The EV cooling oil channel 33 is a circulation path in which an electric oil pump 48, the EV oil cooler 38, the front motor 4, and the power generator 9 are mounted in this order, and that is filled with cooling oil. The electric oil pump 48 is driven to circulate the cooling oil in the EV cooling oil channel 33. Thus, cooling oil at a low temperature cooled by the EV oil cooler 38 can cool the front motor 4 and the power generator 9.

Further, in this embodiment, the hybrid control unit 20 has a restriction control function of restricting the battery charge mode to ensure cooling performance of the cooling system 30 (restriction unit).

FIG. 3 is a flowchart showing a manner of restriction control in the battery charge mode of the hybrid control unit 20.

This routine is performed in operation of the battery charge mode switch 23. Specifically, this routine is performed when the battery charge mode switch 23 for forcedly switching to the battery charge mode is manually turned on by an occupant of the vehicle 1.

First, in Step S10, the engine cooling water temperature Tw is input from the cooling water temperature sensor 40, and it is determined whether or not the engine cooling water temperature Tw is a threshold T1 (first predetermined temperature) or higher. The threshold T1 may be set to a value at which it is difficult to ensure cooling performance by the engine cooling water, for example, a predetermined value of 100° C. or higher (a desirable value is lower than the predetermined temperature at which the cooling water temperature indicator 41 lights up as described above). When the engine cooling water temperature Tw is the threshold T1 or higher, the process proceeds to Step S20. When the engine cooling water temperature Tw is lower than the threshold T1, the process returns to Step S10. When the engine cooling water temperature Tw is the threshold T1 or higher, the battery charge mode switch 23 is turned off, and the battery charge mode is restricted.

In the battery charge mode, the rotational speed of the engine 2 is set to the first rotational speed or higher that is higher than the idling speed to increase the output, and the electric power to be generated by the power generator 9 is increased to increase the state of charge of the driving battery 11. However, when the battery charge mode is turned off in Step S20, the rotational speed of the engine 2 is set to the idling speed to set the output to an idle state. Then, the process proceeds to Step S30.

In Step S30, the engine cooling water temperature Tw is input from the cooling water temperature sensor 40, and it is determined whether or not the engine cooling water temperature Tw is a threshold T2 (second predetermined temperature) or lower. The threshold T2 is set to, for example, a value about 5° C. lower than the threshold T1. When the engine cooling water temperature Tw is the threshold T2 or lower, the process proceeds to Step S40. When the engine cooling water temperature Tw is higher than the threshold T2, the process returns to Step S30.

In Step S40, the engine 2 is forcedly stopped. Then, the routine is finished.

With the control as described above, in this embodiment, when the engine cooling water temperature Tw is the threshold T1 or higher, the engine 2 is driven at the idling speed to reduce the amount of power generation by the power generator 9, and the battery charge mode (forced power generation mode), in which the load on the engine 2 or the power generator 9 is increased, is restricted. As such, when the engine cooling water temperature is the threshold T1 or higher, cooling performance of the engine 2 is likely to be reduced. Thus, the battery charge mode in which the load on the engine 2 is increased is restricted, and the engine 2 is driven at the idling speed to limit the load on the engine 2, thereby ensuring the cooling performance of the engine 2. In particular, the threshold T1 is set to the value lower than the predetermined temperature (abnormal temperature) at which the cooling water temperature indicator 41 lights up as described above to restrict the battery charge mode at the threshold T1 lower than the abnormal temperature, thereby reliably avoiding an abnormal state of the engine cooling water.

Also, the battery charge mode is restricted to reduce the amount of power generation by the power generator 9 and thus reduce the load on the power generator 9, thereby limiting a temperature increase of the cooling oil in the EV cooling oil channel 33. This can also ensure cooling performance of the power generator 9 and the front motor 4 mounted in the EV cooling oil channel 33.

In the cooling system 30, in the case where the engine cooling water channel 31, the EV cooling water channel 32, and the EV cooling oil channel 33 in which the heat medium is circulated are each independent circuits, but the heat exchanger 34 (engine radiator 35, EV radiator 37, EV oil cooler 38, or the like) is integrally configured, these instruments may have a mutual influence on cooling performance because outside air for heat exchange is partially shared. Specifically, in the battery charge mode, the load on the engine 2 or the power generator 9 increases, and an amount of cooling by the engine radiator 35 or the EV oil cooler 38 increases, which may reduce cooling performance of the EV radiator 37.

Then, as in this embodiment, when the engine cooling water temperature Tw is the threshold T1 or higher, the battery charge mode is restricted to limit the load on the engine 2 or the power generator 9. This can also limit a reduction in cooling performance of the front motor control unit 10*a*, the charger 21, the rear motor control unit 12*a*, and the rear motor 6 mounted in the EV cooling water channel 32.

In this embodiment, when the engine cooling water temperature Tw is the threshold T1 or higher, the battery charge mode is restricted for idling, and then the engine 2 is stopped after the engine cooling water temperature Tw decreases to the threshold T2.

As such, idling of the engine 2 can limit the load on the engine 2, and also maintain circulation of the engine cooling water to prevent a partial temperature increase in the engine cooling water channel 31. Thus, the inside of the engine cooling water channel 31 is protected, and temperature detection of the engine cooling water is accurately performed by the cooling water temperature sensor 40. Thus, it can be prevented that a partial temperature increase of the engine cooling water around the cooling water temperature sensor 40 causes the cooling water temperature indicator 41 to light up immediately after the restriction of the battery charge mode, thereby increasing reliability of the cooling water temperature indicator 41.

Also, the engine 2 is stopped when the engine cooling water temperature Tw decreases to the threshold T2 after idling of the engine 2. This can reliably reduce the engine cooling water temperature Tw thereafter, and reliably protect the engine 2 or the like.

If the engine cooling water temperature Tw is the threshold T1 or higher in the battery charge mode as described above, the engine 2 is driven at the idling speed or lower, and then finally the engine 2 is stopped. If the engine cooling water temperature Tw is lower than the threshold T2, the occupant may again operate the battery charge mode switch 23 to start the engine 2 and restore charging of the driving battery 11.

The present invention is not limited to the above described embodiment. For example, in the restriction control in the battery charge mode shown in FIG. 3, the battery charge mode is restricted when the engine cooling water temperature Tw is the threshold T1 or higher, and then the engine 2 is stopped after the engine cooling water temperature Tw decreases to the threshold T2. However, the engine 2 may be stopped after a lapse of a predetermined time from the restriction of the battery charge mode. Also in this case, the circulation of the engine cooling water can be maintained for a predetermined time to limit a partial temperature increase of the engine cooling water as in the above described embodiment.

Also, for the cooling system 30, configurations of the EV cooling water channel 32 and the EV cooling oil channel 33, instruments that are mounted and to be cooled or the like can be changed, and the cooling system 30 can be applied to a hybrid vehicle including a cooling system of various types. For example, for a configuration in which engine cooling water cools an electric instrument such as an inverter, restriction of the battery charge mode can ensure cooling performance of at least the engine 2 and the electric instrument.

Also, the plug-in hybrid vehicle is exemplified in the above described embodiment, but the present invention can be applied to a hybrid vehicle including no charger 21.

What is claimed is:

1. A charge control device for a hybrid vehicle, comprising:
    an engine that drives a power generator included in the vehicle;
    an engine cooling water channel that recirculates a cooling water of the engine;
    a driving motor that causes the vehicle to travel by electric power supplied from a driving battery;
    a temperature detection unit for detecting a temperature of cooling water of the engine; and
    a power generation control unit for controlling switching between a normal power generation mode in which the engine is driven at a first rotational speed to drive the power generator to generate electric power and charge the driving battery to a predetermined amount of charge, and a forced power generation mode in which the engine is driven at a second rotational speed higher than the first rotational speed to drive the power generator to generate electric power and charge the driving battery so as to maintain a higher amount of charge of the driving battery than the predetermined amount of charge; and
        an engine control unit for controlling a rotational speed of the engine in accordance with a control signal sent from the power generation control unit, wherein
    the power generation control unit sends the control signal to the engine control unit to drive the engine at a speed not higher than the idling speed to reduce an amount of electric power generation by the power generator and to maintain circulation of the cooling water in the engine cooling water channel when the detected temperature of the cooling water of the engine becomes higher than a first predetermined temperature that is lower than a cooling water temperature at which a cooling water temperature indicator provided on a driver's seat panel in the vehicle lights up, while the forced power generation mode is being performed.

2. The charge control device for a hybrid vehicle according to claim 1, wherein
    the power generation control unit forcedly stops the engine after a lapse of a predetermined time from a reduction in driving force of the engine when the temperature of the cooling water of the engine is higher than the first predetermined temperature.

3. The charge control device for a hybrid vehicle according to claim 2, wherein
    the predetermined time is a time between when the driving force of the engine is reduced and when the temperature of the cooling water of the engine is lower than a second predetermined temperature lower than the first predetermined temperature.

4. The charge control device for a hybrid vehicle according to claim 1, further comprising:
    a switch for instructing the power generation control unit to forcedly switch to the forced power generation mode when the switch is manually turned on by an occupant.

5. The charge control device for a hybrid vehicle according to claim 2, further comprising:
    a switch for instructing the power generation control unit to forcedly switch to the forced power generation mode when the switch is manually turned on by an occupant.

6. The charge control device for a hybrid vehicle according to claim 3, further comprising:
    a switch for instructing the power generation control unit to forcedly switch to the forced power generation mode when the switch is manually turned on by an occupant.

7. The charge control device for a hybrid vehicle according to claim 4, wherein
    the switch is automatically turned off when the detected temperature of the cooling water of the engine becomes higher than the first predetermined temperature.

8. The charge control device for a hybrid vehicle according to claim 5, wherein
    the switch automatically is turned off when the detected temperature of the cooling water of the engine becomes higher than the first predetermined temperature.

9. The charge control device for a hybrid vehicle according to claim 6, wherein
    the switch is automatically turned off when the detected temperature of the cooling water of the engine becomes higher than the first predetermined temperature.

10. The hybrid vehicle according to claim 9, further comprising:
    an indicator that turns on when the detected temperature of the cooling water of the engine is at an abnormal temperature higher than the first predetermined temperature.

11. The charge control device for a hybrid vehicle according to claim 1, wherein the first rotational speed is higher than the idling speed.

12. The charge control device for a hybrid vehicle according to claim 1, wherein the speed not higher than the idling speed is the idling speed.

* * * * *